United States Patent [19]

Bawa et al.

[11] Patent Number: 5,051,541
[45] Date of Patent: Sep. 24, 1991

[54] PLASTIC ELECTRICAL CONNECTOR FOR LIQUIDTIGHT CONDUIT

[75] Inventors: Jaspal S. Bawa, Neshanic Station; Luis R. Couto, Hillside; Giacomo F. Mancini, Piscataway, all of N.J.

[73] Assignee: Thomas & Betts Corporation, Bridgewater, N.J.

[21] Appl. No.: 498,295

[22] Filed: Mar. 23, 1990

[51] Int. Cl.⁵ .................................................. F16L 33/22
[52] U.S. Cl. ................................... 174/65 SS; 285/161; 285/343
[58] Field of Search ................... 174/65 SS; 285/161, 285/243, 322, 343

[56] References Cited

U.S. PATENT DOCUMENTS

| | | | |
|---|---|---|---|
| 2,561,827 | 7/1951 | Soos | 285/86 |
| 2,693,377 | 11/1954 | Wurzburger | 285/343 |
| 3,184,706 | 5/1965 | Atkins | 339/177 |
| 3,243,206 | 3/1966 | Samer | 285/162 |
| 3,394,954 | 7/1968 | Sarns | 285/319 |
| 3,624,591 | 11/1971 | Buberniak | 339/103 R |
| 3,695,880 | 5/1972 | Goldsobel | 285/161 |
| 3,958,818 | 5/1976 | Mason | 285/92 |
| 4,209,661 | 6/1980 | Pate et al. | 174/65 R |
| 4,225,162 | 9/1980 | Dola | 285/161 |
| 4,293,178 | 10/1981 | Lee | 339/103 R |
| 4,451,069 | 5/1984 | Melone | 285/86 |
| 4,481,697 | 11/1984 | Bachle | 24/135 R |
| 4,842,548 | 6/1989 | Bolante | 439/461 |
| 4,900,068 | 2/1990 | Law | 285/161 |

FOREIGN PATENT DOCUMENTS 0031409  7/1981  European Pat. Off. .

OTHER PUBLICATIONS

Thomas & Betts Electrical Construction and Maintenance Products, Electrical Division pp. 170-172, 189-195, 203-204, 215-217, 233, Dated 1988.

Heyco Molded Products, Inc. Advertisement, Entitled "Heyco ® Hi-Flex ®II; The Installer Friendly Liquid Tight Connector/Conduit System", Undated, 1 page.

Arlington Industries, Inc. Advertisement Entitled "Straight and 90° Angle Connectors for Liquidtight Flexible Non-Metallic Conduit", 1 page, Dated 1989.

Hubbell Inc. Installation Instructions Entitled "Liquid Tight Flexible Non-Metallic Conduit Connectors", 1 page Dated Aug. 1986.

Oz-Gedney Installation Instructions, Entitled "4Q-P Non-Metallic Liquid Tight Connectors", Undated, 1 page.

*Primary Examiner*—Leo P. Picard
*Assistant Examiner*—David A. Tone
*Attorney, Agent, or Firm*—Robert M. Rodrick; Salvatore J. Abbruzzese

[57] ABSTRACT

A plastic electrical connector for connecting liquidtight flexible electrical conduit to an electrical component such as a junction box or outlet, comprises a plastic body and a plastic gland nut threadably attached thereto. The body includes a plurality of flexible fingers, each of which includes a collapsible section defined by plural, discrete hinges, the deformable section being bendable at each hinge. Gripping teeth are provided on the interior surface of the ends of the flexible fingers. The gland nut includes an inclined surface engageable with the flexible fingers for causing radial compression against the conduit. The gland nut further includes a pushing surface for engaging the distal end of the flexible fingers, which are preferably arranged in cantilevered form. Upon tightening the gland nut on the body, the gripping fingers engage the conduit, and as the collaspsible sections bend, the fingers axially move the conduit deeper into the connector for a liquidtight seal therewith.

19 Claims, 5 Drawing Sheets

PLASTIC ELECTRICAL CONNECTOR FOR LIQUIDTIGHT CONDUIT

FIELD OF THE INVENTION

The present invention relates to electrical connectors, and more particularly to liquidtight connectors which connect electrical components, such as junction boxes or outlet boxes with liquidtight flexible conduits.

BACKGROUND OF THE INVENTION

Liquidtight flexible conduit is used in many applications, including industrial applications, to protect electric current-carrying wires. The wires, which may be bare or covered by insulation, are pulled through the conduit which is typically tubular and has an axial bore. As such, the wires contained in such conduit may be protected from the environments in various applications. Externally, the conduit may be smooth or convoluted.

Various electrical connectors for connecting flexible conduit to electrical components and for providing a liquidtight seal thereto are known. Connectors of this type may be formed of metal, plastic or both metal and plastic. For example, U.S. Pat. No. 4,842,548 issued to Bolante on Jun. 27, 1989 shows an all-plastic connector while U.S. Pat. No. 3,659,880 issued to Goldsobel on May 2, 1972 shows a connector with portions made of plastic and metal. In addition to these known devices, in an effort to provide a liquidtight seal against chemical or liquid environments in industrial applications and to enhance the pull-out resistance of the flexible conduit from the connector, various other known connector constructions have been developed. For instance, connectors having flexible fingers, conduit engagement portions with screw threads for attachment to conduit, gripping serrations or teeth and deformable wedges are all known. However, in addition to considering cost as well as providing a reliable liquidtight seal with high conduit pull-out resistance, difficulties in field use must also be addressed. For example, it is not uncommon that the liquidtight conduit be cut by a user to have an irregular or ragged end surface. Such irregular end surface, if not seated properly in the connector, may result in a poor liquidtight seal. Accordingly, it is desirable to provide a connector that can accommodate such irregular conduit cuts and yet provide a suitable liquidtight seal.

SUMMARY OF THE INVENTION

It is an object of the present invention to provide an improved electrical connector for connection to electrical components and liquidtight electrical conduit.

It is a further object of the present invention to provide an electrical connector which provides greater tolerance to conduit end surface irregularities.

In accordance with a preferred arrangement of the subject invention, an electrical connector for connecting liquidtight electrical conduit to an electrical component is provided. The connector comprises a gland nut having a centrally located bore therethrough, the gland nut including internal threads and engagement means on the interior of the gland nut. The connector also includes a body having a component connecting portion, a flange portion and a conduit connecting portion with a bore extending axially therethrough. The component connecting portion projects axially from the flange portion in one direction and comprises external thread means for connecting the body to the electrical components. The conduit connecting portion projects axially from the flange portion in a direction opposite the component connecting portion. The conduit connecting portion includes an elongate internal tubular ferrule through the body bore extends and an outer cylindrical ring. The ferrule is adapted to receive the liquidtight conduit thereon and is radially spaced from the ring defining thereby a cavity therebetween. The ring includes external threads engageable with the internal threads on the gland nut. A plurality of flexible fingers projects axially from the ring. The flexible fingers comprise means responsive to the engagement means on the gland nut upon tightening the gland nut on the body for compressively engaging the conduit and for axially moving the conduit along the ferrule into the cavity, whereby the conduit and the body are secured in a liquidtight connection.

In accordance with a preferred form of the invention, each flexible finger includes a conduit engaging member and collapsible means between the conduit engaging members and the body ring which permits the conduit engaging member to move axially toward the ring and radially toward the ferrule.

DETAILED DESCRIPTION OF THE PREFERRED EMBODIMENTS

Figure 1:
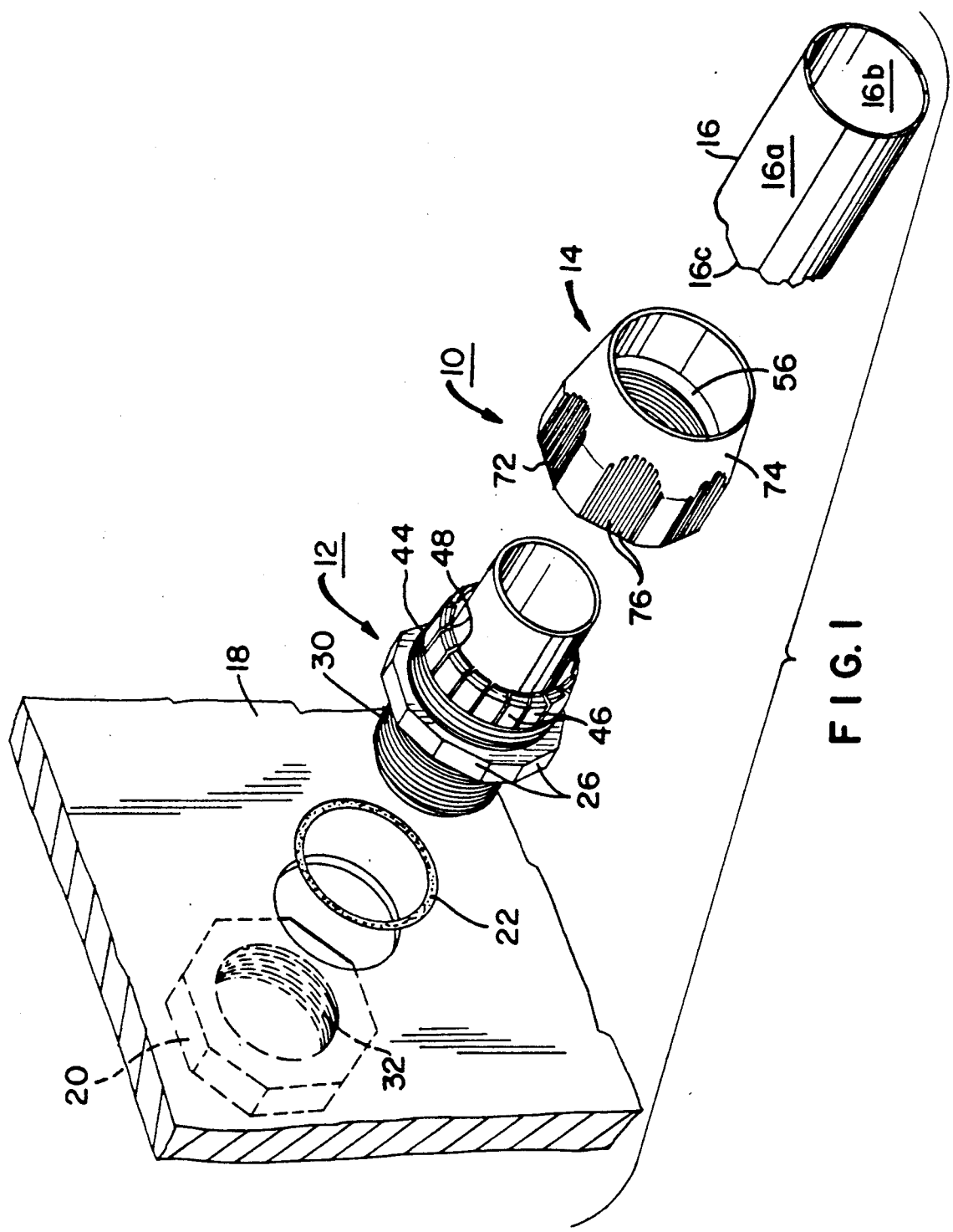
FIG. 1 is a perspective, exploded view of a preferred embodiment of the connector of the subject invention showing a portion of a flexible liquidtight conduit and a panel of an electrical component to which the connector is to be connected.

Referring now to the drawing, there is shown in FIG. 1 an electrical connector 10 in accordance with a preferred form of the invention. The connector 10 is a two-part, all-plastic connector comprising a body 12 and a gland nut 14. The connector 10, as will be described more fully hereinbelow, is particularly adapted to connect in liquidtight manner to a flexible, liquidtight conduit 16 which may have a smooth exterior surface 16a, as shown, or a convoluted surface. The conduit interior surface 16b is smooth. The end surface 16c of the conduit may, as a result of cutting by users in the field, have an uneven or jagged surface. The connector body 12 is particularly adapted for liquidtight connection to a panel of an electrical component, such as an electrical outlet or junction box by means of a lock nut 20 and an elastomeric O-ring 22 which is resiliently compressed between the body 12 and the panel 18.

Figure 2:
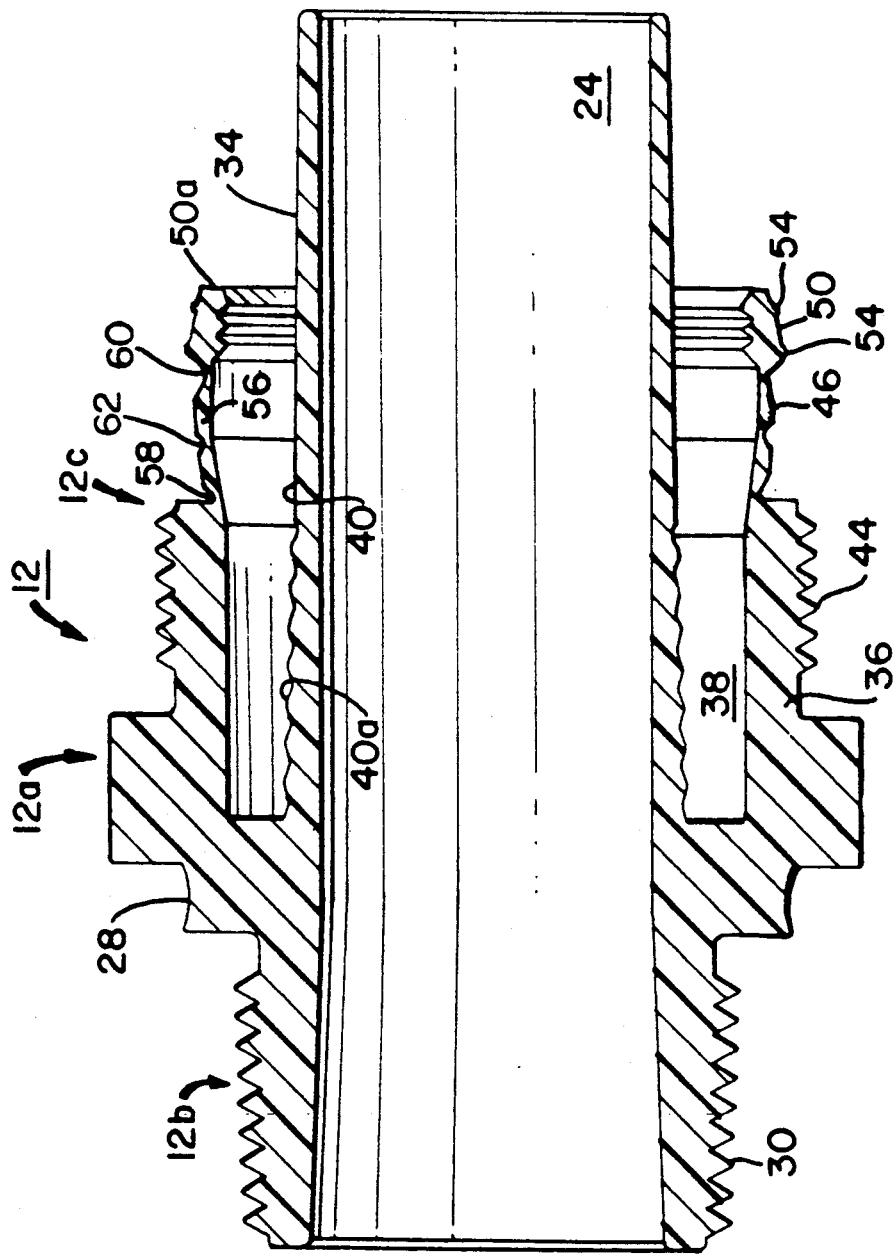
FIG. 2 is a longitudinal cross-section of the body of the electrical connector of FIG. 1.

Turning now also to FIG. 2, the details of the connector body may be more fully understood. The connector body 12 is preferably formed of one-piece construction of insulative material, preferably plastic, such as nylon. The body 12 is of generally hollow cylindrical construction comprising a centrally located flange portion 12a, a component connecting portion 12b projecting from the flange portion 12a in one direction and a conduit connecting portion 12c projecting from the flange portion 12a in the opposite direction. An axial bore 24 extends fully through the body 12. The flange portion 12a extends generally transversely to the axially extending bore 24 and, as shown in FIG. 1, comprises a plurality of flat surfaces 26, preferably in hexagonal configuration, to facilitate tightening to the panel 18 by a suitable tool or by hand. The flange portion 12a further includes a cradle 28 preferably having a concave surface for seating the elastomeric O-ring 22 thereon for providing a liquidtight seal between the body 12 and the panel 18 of the electrical component to which the connector 10 is attached.

The component connecting portion 12b includes a series of external threads 30 for mateable threadable engagement with the threads 32 of the lock nut 20, whereby the body 12 may be sealably secured to the electrical component panel 18. The threads 30 on the component connecting portion 12b of the body 12 are of diameter to fit through an opening 18a formed in the panel while the O-ring is compressed against the exterior surface of the panel 18 upon tightening the body 12 to the lock nut 20. Alternatively, interior threads may be provided on the inner surface of the opening 18a for engageable receipt of the threads 30 on the body connecting portion 12b.

The conduit connecting portion 12c includes a longitudinally extending, elongate, internal tubular ferrule 34 through which the axially extending bore 24 extends. Radially spaced from the tubular ferrule 34 is an outer cylindrical ring 36. The ferrule 34 and the ring 36 define a generally tubular cavity 38 therebetween, for receipt of the flexible conduit 16, as will be described in detail hereinafter.

The ferrule 34 includes an exterior surface 40 defining one wall of the cavity 38 for receiving and supporting thereon the interior surface 16b of the flexible conduit 16. As the ferrule exterior surface 40 extends into the cavity 38 toward the flange portion 12a, the outer diameter of the ferrule 34 preferably increases, thereby providing a tapered surface 40a.

Tapered surface 40a increases gradually outwardly toward the ring 36 in the direction deeper in the cavity 38 toward the flange portion 12a. On tapered surface 40a there are preferably provided a plurality of friction-reducing elements 42 thereon, as more particularly described in copending, commonly assigned patent application entitled, "Electrical Connector For Liquidtight Conduit", U.S. patent application Ser. No. 498,293, filed Mar. 23, 1990.

The body ring 36 comprises external threads 44 at a location proximate the flange portion 12a. Disposed more distally from the flange portion 12a and projecting longitudinally outward from the threads 44 on ring 36 are a plurality of cantilevered, flexible fingers 46. As illustrated in FIG. 1, each finger 46 is separated from another finger 46 by a longitudinally extending slot 48. Each finger 46 terminates at its free distal end in a conduit engaging member 50. A relatively flat contact surface 50a is preferably provided on the extreme distal end of each finger 46. Disposed on the interior surface at the distal end of each conduit engaging member 50 are relatively sharp teeth 52 or serrations for gripping engagement with the outer surface 16a of conduit 16, as will be described. It should be appreciated that the number and shape of teeth 52 may vary. Projecting outwardly from the outer surface of each conduit engaging member 50 there are preferably provided a pair of friction-reducing members 54, as more fully described in the above-mentioned commonly assigned U.S. patent application, Ser. No. 498,293, filed Mar. 23, 1990.

The conduit engaging member 50 of each flexible finger 46 is joined to the body ring 36 by a collapsibly deformable section 56. Section 56 has three hinge points for bending of the finger during engagement with the gland nut, as will be described. Hinge 58 is provided at the juncture of section 56 and ring 36, hinge 60 is provided at the juncture of section 56 and conduit engaging member 50 and hinge 62 is located in section 56 intermediate hinges 58 and 60. Section 56 is thus bendable at three discrete locations. As will be set forth hereinbelow, the bending of the flexible fingers 46 at plural locations provides for both radial and axial movement of the conduit engaging members 50 upon tightening of the gland nut 14 onto body 12.

Figure 3B:
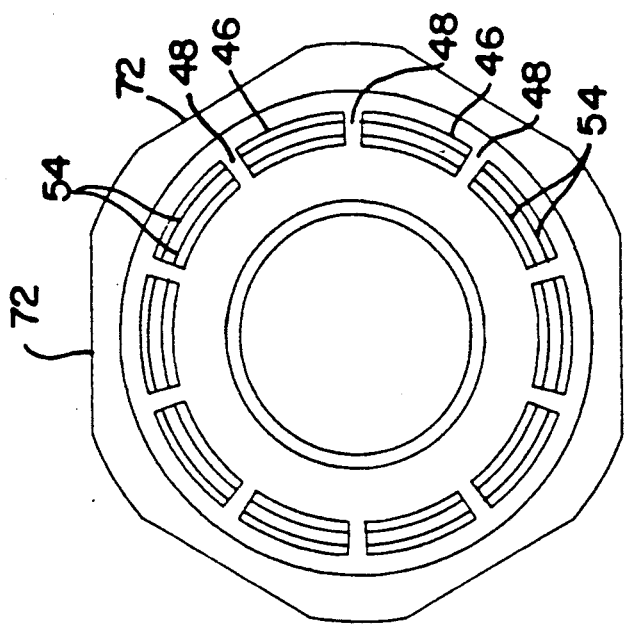
FIG. 3(b) is a plan view in schematic form of the connector in the pre-connected condition of FIG. 3(a).
Figure 3A:
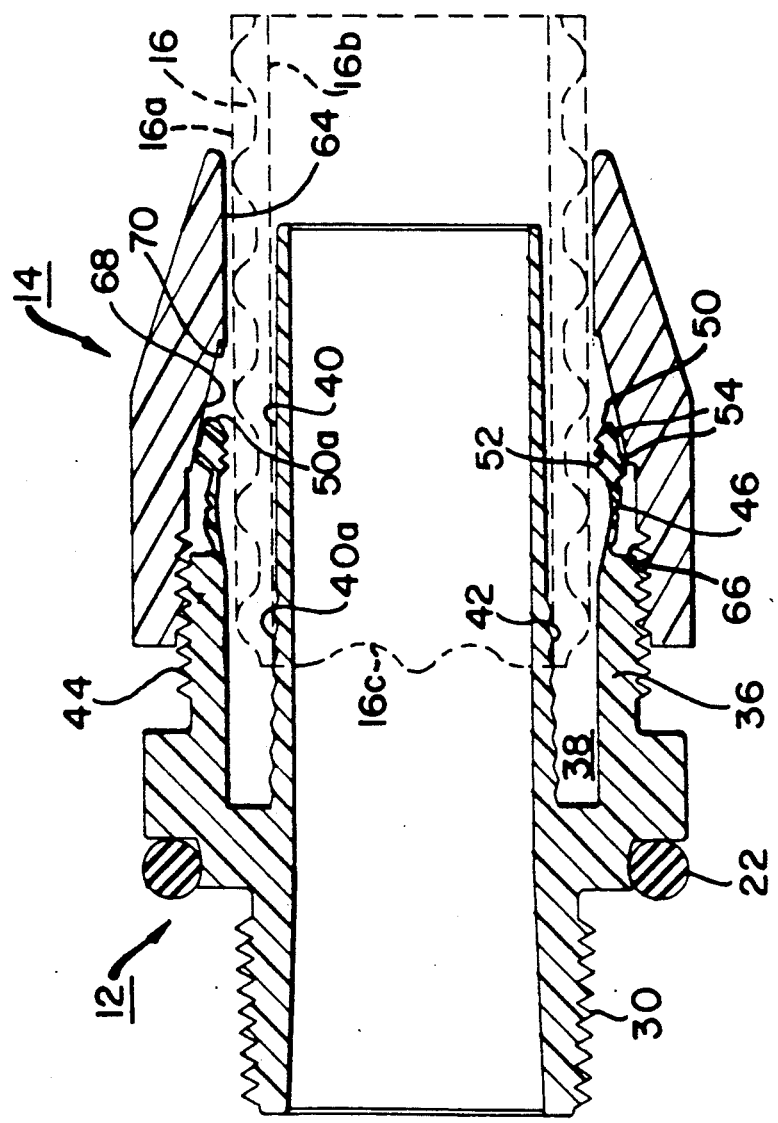
FIG. 3(a) is a longitudinal cross-sectional view of the connector of FIG. 1 showing the body and gland nut of the subject connector in a pre-connected condition to a flexible conduit.

Referring now to FIG. 1, FIG. 3(a) and FIG. 3(b), the details of the gland nut are described. The gland nut 14 is preferably formed in a unitary manner of insulative material, preferably plastic, such as nylon. Gland nut 14 has a central, axially extending bore 64 extending therethrough, for receipt of the conduit 16. Internal threads 66 are provided for mateable, threadable engagement with the ring external threads 44. On the interior of the gland nut 14 there is provided an inclined contact surface 68 of generally frusto-conical configuration and extending circumferentially around the interior surface of the gland nut 14. Also extending around the inner circumferential surface of the gland nut 14 is a pushing surface 70. Surface 70 communicates with inclined surface 68 and with the wall of bore 64, surface 70 extending in the preferred arrangement substantially perpendicular to the longitudinal axis of central bore 64.

The exterior surface of the gland nut 14 comprises a portion having a series of flat surfaces 72 and a generally smooth, frusto-conical outer surface 74. A plurality of longitudinally extending grooves 76 may be provided to serve as gripping surfaces for facilitating handling of the gland nut and hand tightening to the connector body 12.

Figure 4B:
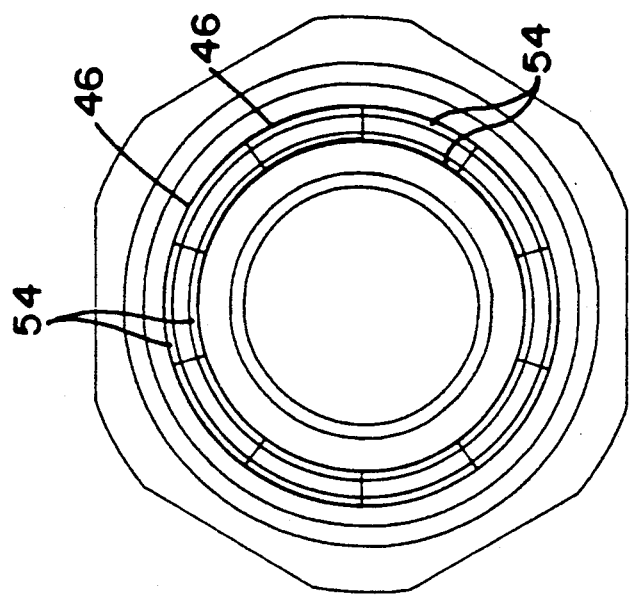
FIG. 4(b) is a plan view, in schematic form, of the electrical connector of 4(a) in connected condition.
Figure 4A:
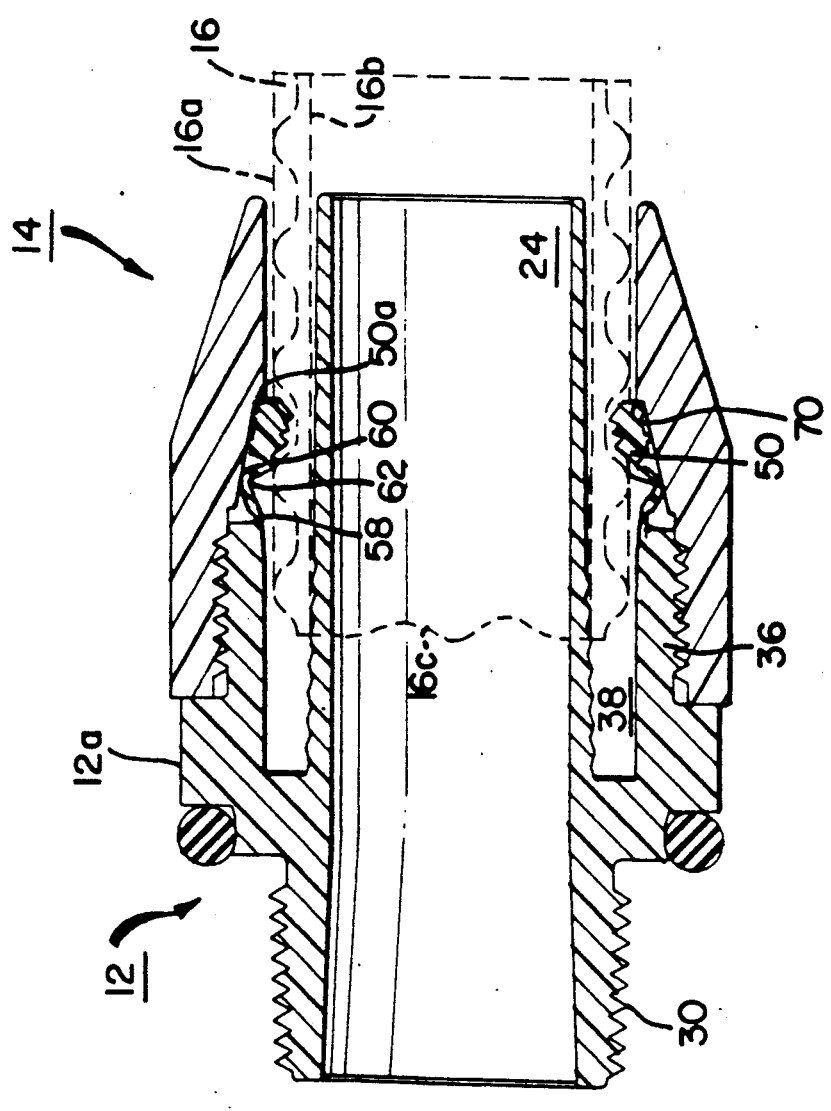
FIG. 4(a) is a longitudinal cross-section of the connector of FIG. 1 shown in connected condition to a flexible conduit.

The operation of the connector 10 is now described with further reference to FIGS. 4(a) and 4(b). The connector body 12 is attached to the panel 18 of an electrical component by means of threadably attaching the lock nut 20 to the external threads 30 on the body 12 which extend through the panel opening 18a. The O-ring 22 is compressed against the outer surface of the panel 18, thereby providing a suitable liquidtight seal. The gland nut 14 is inserted over an electrical conduit 16 with the outer surface 16a of the conduit being received through the centrally located bore 53 of the gland nut 14. The electrical wires (not shown) contained interiorly of a conduit 16 are pulled through the central bore 24 of the body 12 for subsequent electrical connection inside the electrical component. The interior surface 16b of the conduit 16 is slid onto the conduit supporting surface 40 of the body ferrule 34. The conduit is hand pushed onto the ferrule such that the conduit extends into the cavity 38. The interior conduit surface 16b, upon continued pushing, engages the tapered ferrule surface 40a and the friction-reducing elements 42 thereon. By means of the friction-reducing elements 42, the conduit, even though being radially stretched due to the movement along the outwardly tapering surface 40a, may be more readily hand inserted deeper into the cavity 38, with the conduit end surface 16c lying on the tapered ferrule surface 40a.

The gland nut inner threads 66 are then threadably engaged with the ring external threads 44 as illustrated in FIG. 3(a). Initial engagement is established between the inclined contact surface 68 on the gland nut and the conduit engaging members 50 by way of contact with the friction-reducing members 54. Sliding of the conduit engaging members 50 along the inclined contact 68 during tightening of the gland nut 14 on body 12 causes the conduit engaging members 50 to move radially inwardly to thereby compress against the conduit 16 whereby the teeth 52 grippingly engage the outer conduit surface 16a. As further illustrated in FIG. 4(a), continued threadable tightening of the gland nut 14 causes the contact surface 50a on each of the conduit engaging members 50 to contact the pushing surface 70 on the interior of the gland nut 14. Further tightening of the gland nut on the body 12 causes the collapsible section 56 to bend at the location of the three hinges 58, 60 and 62. Thereafter, continued tightening of the gland nut axially moves the conduit engaging members 50 in a direction toward the body ring 36 until the gland nut bottoms against the body flange 12a.

Figure 5A:
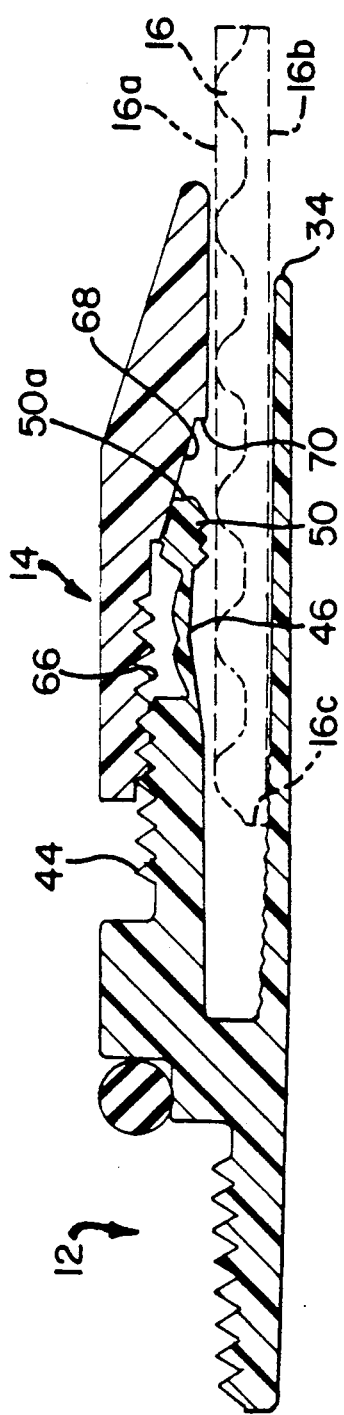
FIGS. 5(a), 5(b) and 5(c) are schematic cross-sectional views illustrating the sequences of operation of the subject invention.
Figure 5B:
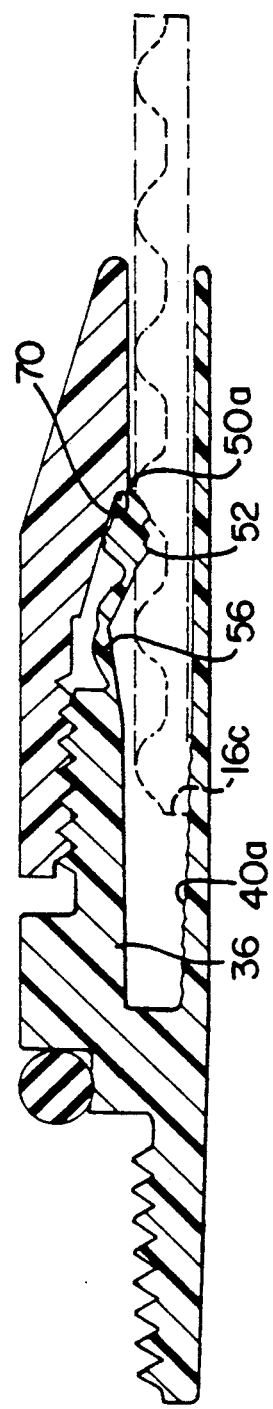
Figure 5C:
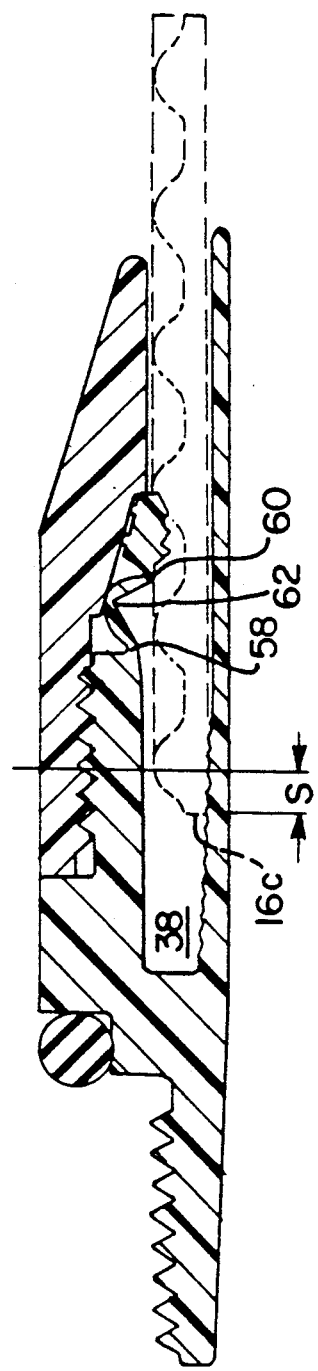

By reference now to FIGS. 5(a), 5(b) and 5(c), the effects and advantages of the subject connector as described herein may be appreciated. FIG. 5(a) schematically represents the relationship between the body 12, gland nut 14 and the conduit 16 in the condition shown in FIG. 3(a). FIG. 5(b) schematically represents an intermediate condition wherein the conduit engaging members 50 are shown upon striking the pushing surface 70 of the gland nut, while FIG. 5(c) illustrates schematically the condition shown in the completed connection of FIG. 4(a). It can be seen that upon tightening the gland nut 14 on the body 12, the conduit engaging members 50 are moved radially toward the body ferrule 34 until the teeth grippingly engage the conduit 16. As the pushing surface 70 engages the contact surface 50a on the conduit engaging members 50, the deformable section 56 of each flexible finger 46 bends at the hinges 58, 60 and 62 permitting axial movement of each conduit engaging member 50 toward the ring 36. As a result of the gripping engagement between the teeth 52 and the conduit 16, such axial movement of the conduit engaging members 50 further pulls the conduit deeper into the cavity 38, along the tapered surface 40a of the ferrule 34. As such, the conduit end 16c is moved axially a distance S deeper into the cavity 38 as illustrated in FIGS. 5(b) and 5(c). This additional movement S allows for a greater tolerance in any irregularities or unevenness that may occur on the conduit end surface 16c as a result of operator cutting during field installation. Thus, as the conduit end 16c is further radially stretched or flared upon tightening of the gland nut 14 on the body 12, a suitable liquidtight seal is established between the inner conduit surface 16b and the body ferrule 34. It can further be seen that during the axial movement of the conduit engaging members 15 toward the ring 36, the orientation of the members 50 relative to the conduit 16 is substantially maintained.

Thus, upon bottoming the gland nut 14 against the body flange 12a as depicted in FIG. 4(b), the flexible fingers 46 are radially compressed in such a manner to circumferentially engage, or nearly engage, each other at the distal ends thereof. This condition is maintained during tightening of the gland nut on the body 12. Accordingly, a liquidtight seal between the outer surface of the conduit 16 and the connector 10 is provided.

Having described the preferred embodiment of the subject connector and its operation, it should be understood that variations may be made thereto without departing from the contemplated scope of the invention. As such, it should be understood that the body and gland nut described herein may be formed differently and be made of different materials than as described in the preferred embodiment. For example, the body need not necessarily be of integral, one piece construction, but may be a composite of both metal and plastic. Similarly, the gland nut may be made of metal. Accordingly, it should be understood that the preferred embodiment described herein is intended only in an illustrative rather than a limiting sense. The true scope of the invention is set forth in the claims appended hereto.

We claim:

1. An electrical connector for connecting liquidtight electrical conduit to an electrical component, comprising:

a gland nut having a centrally located bore therethrough, said gland nut including internal threads and engagement means on the interior of said gland nut; and a body including a component connecting portion, a flange portion and a conduit connecting portion and a bore extending axially therethrough, said component connecting portion projecting axially from said flange portion in one direction and comprising external thread means for connecting said body to said electrical component, said conduit connecting portion projecting axially from said flange portion in a direction opposite said component connecting portion, said conduit connecting portion including an elongate internal tubular ferrule through which said body bore extends and an outer cylindrical ring, said ferrule being adapted to receive a liquidtight conduit thereon and being radially spaced from said ring and defining thereby a cavity therebetween, said ring including external threads engageable with the internal threads on said gland nut and a plurality of flexible fingers projecting axially therefrom, said flexible fingers comprising means responsive to the engagement means on said gland nut upon tightening said gland nut on said body for compressively engaging said conduit and for axially moving said conduit along said ferrule into said cavity, whereby said conduit and said body are secured in a liquidtight connection, said means responsive to the engagement means comprising a conduit engaging member disposed at a free end of flexible fingers, said means responsive to the engagement means further comprising a deformable section on said flexible fingers between said ring and said conduit engaging members, said deformable section being bendable at plural, discrete locations.

2. An electrical connector according to claim 1, wherein a conduit engaging member is disposed at a free end of each flexible finger.

3. An electrical connector according to claim 1, wherein said deformable section is bendable at a location intermediate said ring and said conduit engaging member.

4. An electrical connector according to claim 3, wherein said deformable section is joined to said ring and is bendable thereat.

5. An electrical connector according to claim 4, wherein said deformable section is joined to said conduit engaging member and is bendable thereat.

6. An electrical connector according to claim 5, wherein said conduit engaging member comprises teeth projecting radially inwardly toward said ferrule.

7. An electrical connector according to claim 1, wherein said engagement means on said gland nut comprises an inclined surface on the interior of said gland nut engageable with said conduit engaging member for compressively moving said conduit engaging member toward said ferrule.

8. An electrical connector according to claim 7, wherein said inclined surface comprises a frusto-conical surface.

9. An electrical connector according to claim 7, wherein said engagement means on said gland nut comprises a pushing surface on the interior of said gland nut engageable with said conduit engaging member for axially moving said conduit engaging member toward said ring.

10. An electrical connector according to claim 9, wherein said pushing surface extends substantially perpendicular to the axis of said central bore of said gland nut.

11. An electrical connector according to claim 1, wherein said body comprises insulative material.

12. An electrical connector according to claim 11, wherein said body comprises an integral, one piece construction of insulative material.

13. An electrical connector according to claim 1, wherein said gland nut comprises insulative material.

14. An electrical connector for connecting liquidtight electrical conduit to an electrical component, comprising:

an insulative body including a component connecting portion, a flange portion and a conduit connecting portion and a bore extending axially therethrough, said component connecting portion projecting axially from said flange portion in one direction and comprising external thread means for connecting said body to said electrical component, said conduit connecting portion projecting axially from said flange portion in a direction opposite said component connecting portion, said conduit connecting portion including an elongate internal tubular ferrule through which said body bore extends and an outer cylindrical ring, said ferrule and said ring being radially spaced and defining a cavity therebetween, said ring including external threads and a plurality of flexible fingers projecting generally axially therefrom, said flexible fingers terminating in a conduit engaging member having gripping elements facing said ferrule, each finger including between said ring and said conduit engaging member collapsible means permitting said conduit engaging member to move axially toward said ring and radially toward said ferrule, said collapsible means comprising a deformable section joined to a respective conduit engaging member and said ring, each deformable section being bendable at plural, discrete locations; and an insulative gland nut having a centrally located bore therethrough, said gland nut including internal threads engageable with said external threads on said body ring and engagement means on the interior of said gland nut;

wherein said ferrule and said gland nut bore are adapted to receive a liquidtight conduit, said gland nut internal threads being threadably engageable with said ring external threads to join said nut to said body, said engagement means on said gland nut being cooperatively engageable with respective conduit engaging members on said fingers upon threadably tightening said nut onto said body to radially urge said fingers into compressed engagement with said conduit and axially move said conduit engaging members and thereby said conduit along said ferrule into said cavity, securing said conduit to said body and providing a liquidtight connection therebetween.

15. An electrical connector according to claim 14, wherein each said deformable section is bendable at a juncture between said deformable section and said ring, at a juncture between said deformable section and said conduit engaging member and at a location intermediate said ring and said conduit engaging member.

16. An electrical connector according to claim 15, wherein said engagement means on said gland nut comprises an inclined surface on the interior of said gland nut engageable with each conduit engaging member for radially urging said conduit engaging members toward said ferrule for engagement with said conduit.

17. An electrical connector according to claim 16, wherein said engagement means on said gland nut comprises a pushing surface on the interior of said gland nut engageable with each conduit engaging member for axially moving said conduit engaging members toward said ring.

18. An electrical connector according to claim 14, wherein said body comprises an integral, one piece construction.

19. An electrical connector for connecting liquidtight electrical conduit to an electrical component, comprising:

a gland nut having a centrally located bore therethrough, said gland nut including internal threads and engagement means on the interior of said gland nut; and a body including a component connecting portion, a flange portion and a conduit connecting portion and a bore extending axially therethrough, said component connecting portion projecting axially from said flange portion in one direction and comprising external thread means for connecting said body to said electrical component, said conduit connection portion projecting axially from said flange portion in a direction opposite said component connecting portion, said conduit connecting portion including an elongate internal tubular ferrule through which said body bore extends and an outer cylindrical ring, said ferrule being adapted to receive a liquidtight conduit thereon and being radially spaced from said ring and defining thereby a cavity therebetween, said ring including external threads engageable with the internal threads on said gland nut and a plurality of flexible fingers projecting axially therefrom, said flexible fingers comprising means responsive to the engagement means on said gland nut upon tightening said gland nut on said body for compressively engaging said conduit and for axially moving said conduit along said ferrule into said cavity, whereby said conduit and said body are secured in a liquidtight connection;

said means responsive to the engagement means comprising a conduit engaging member disposed at a free end of flexible fingers;

said engagement means on said gland nut comprising an inclined surface on the interior of said gland nut engageable with said conduit engaging member for compressively moving said conduit engaging member toward said ferrule, said engagement means on said gland nut further comprising a pushing surface on the interior of said gland nut engageable with said conduit engaging member for axially moving said conduit engaging member toward said ring, said pushing surface extending substantially perpendicular to the axis of said central bore of said gland nut.

* * * * *